(12) United States Patent
Ugurlu et al.

(10) Patent No.: US 11,388,764 B2
(45) Date of Patent: Jul. 12, 2022

(54) METHOD AND APPARATUS FOR USER EQUIPMENT-ASSISTED COVERAGE ENHANCEMENT IN MOBILE COMMUNICATIONS

(71) Applicant: MediaTek Singapore Pte. Ltd., Singapore (SG)

(72) Inventors: Ahmet Umut Ugurlu, Cambridge (GB); Francesc Boixadera-Espax, Cambridge (GB); Pei-Kai Liao, Hsinchu (TW); Nathan Edward Tenny, San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 157 days.

(21) Appl. No.: 16/862,475

(22) Filed: Apr. 29, 2020

(65) Prior Publication Data
US 2020/0351965 A1    Nov. 5, 2020

Related U.S. Application Data

(60) Provisional application No. 62/840,460, filed on Apr. 30, 2019.

(51) Int. Cl.
*H04W 76/14* (2018.01)
*H04W 8/24* (2009.01)
(Continued)

(52) U.S. Cl.
CPC ............. *H04W 76/14* (2018.02); *H04W 8/24* (2013.01); *H04W 88/085* (2013.01); *H04W 92/14* (2013.01); *H04W 92/18* (2013.01)

(58) Field of Classification Search
CPC ......... G06F 9/445; H04B 7/15; H04B 7/2606; H04B 10/2575; H04M 1/72406;
(Continued)

(56) References Cited

U.S. PATENT DOCUMENTS 10,368,380 B2 * 7/2019 Choi ..................... H04L 5/001
2016/0044613 A1  2/2016 Cai et al.
(Continued)

FOREIGN PATENT DOCUMENTS

| CN | 108616830 A | 10/2018 |
|---|---|---|
| WO | WO 2018044144 A1 | 3/2018 |
| WO | WO 2018196497 A1 | 11/2018 |

OTHER PUBLICATIONS

Taiwan Intellectual Property Office, Office Action for Taiwan Patent Application No. 109114527, dated Jul. 14, 2021.
(Continued)

*Primary Examiner* — Thomas R Cairns
(74) *Attorney, Agent, or Firm* — Han IP PLLC; Andy M. Han

(57) ABSTRACT

Various solutions for coverage extension allowing improved high-frequency and high-data-rate cellular coverage of devices located in conditions of poor network coverage in mobile communications are described. The described solutions may extend coverage, for example, via a sidelink interface between two mobile devices, a relay device in good coverage and a remote device that may be in poor coverage, thus allowing the remote device to communicate using the relay device as a backhaul link to a cellular network.

17 Claims, 11 Drawing Sheets

(51) Int. Cl.
*H04W 88/08* (2009.01)
*H04W 92/18* (2009.01)
*H04W 92/14* (2009.01)

(58) Field of Classification Search
CPC ....... H04W 8/24; H04W 8/245; H04W 16/26;
H04W 52/02; H04W 60/06; H04W
84/047; H04W 84/18; H04W 88/04;
H04W 88/085; H04W 92/14; H04W
92/18

See application file for complete search history.

(56) References Cited

U.S. PATENT DOCUMENTS

| | | | |
|---|---|---|---|
| 2016/0295494 A1* | 10/2016 | Gulati | H04W 72/085 |
| 2017/0295598 A1 | 10/2017 | Hampel et al. | |
| 2017/0331670 A1* | 11/2017 | Parkvall | H04J 11/0079 |
| 2019/0239147 A1* | 8/2019 | Chun | H04W 48/16 |
| 2020/0162997 A1* | 5/2020 | Damnjanovic | H04B 7/15542 |
| 2021/0212050 A1* | 7/2021 | Lu | H04L 5/0094 |

OTHER PUBLICATIONS

China National Intellectual Property Administration, International Search Report and Written Opinion for PCT/CN2020/088217, dated Jul. 29, 2020.
Panasonic, Discussion on relay functionality supported in D2D, 3GPP TSG RAN WG1 Meeting #80bis, R1-151673, Belgrade, Serbia, Apr. 20-24, 2015.

* cited by examiner

METHOD AND APPARATUS FOR USER EQUIPMENT-ASSISTED COVERAGE ENHANCEMENT IN MOBILE COMMUNICATIONS

CROSS REFERENCE TO RELATED PATENT APPLICATION(S)

The present disclosure is part of a non-provisional application claiming the priority benefit of U.S. Patent Application No. 62/840,460, filed on 30 Apr. 2019, the content of which being incorporated by reference in its entirety.

TECHNICAL FIELD

The present disclosure is generally related to coverage extension in mobile communications and, more particularly, to user equipment (UE)-assisted coverage enhancement with respect to UE and network apparatus in mobile communications.

BACKGROUND

Unless otherwise indicated herein, approaches described in this section are not prior art to the claims listed below and are not admitted as prior art by inclusion in this section.

Much of the spectrum made available for 5th generation (5G)/New Radio (NR) cellular operations is in medium-to-high frequencies, such as the so-called C-band (e.g., ~3.5-8 GHz), millimeter-wave spectrum (e.g., frequencies with wavelengths on the order of millimeters such as the range above~24 GHz), and so on. The frequency bands above~24 GHz and up to 52.6 GHz are also known in $3^{rd}$ Generation Partnership Project (3GPP) parlance as Frequency Range 2 (FR2). As compared to cellular frequencies used in previous systems such as Long-Term Evolution (LTE), these frequencies experience high attenuation and have poor building penetration, resulting in limitations to coverage especially for indoor UEs. For example, over 10 dB propagation difference may occur between 1.8 GHz and 3.5 GHz, even larger for higher C-band frequencies. Therefore, there exist extremely challenges on outdoor to indoor penetration for high-frequency spectrum.

When a UE is covered by a low-frequency band, it can communicate with a cellular network using the low-frequency band. Low-frequency bands (e.g., around 700 MHz, 1.8 GHz) may experience lower penetration loss, but there is limited capacity available due to narrow transmission bandwidth. Thus, lower frequencies may provide coverage beyond higher frequencies, but may sacrifice some benefits of NR. Low-frequency bands offer comparatively narrow bandwidths and correspondingly low data rates as compared to high-frequency bands. High-frequency bands (e.g., C-band around 3-6 GHz, millimeter-wave at 28 GHz, etc.) offer much higher achievable capacity, but suffer from penetration loss through the air and/or building walls. Therefore, low-frequency bands are ideal for providing indoor coverage of control information, and high-frequency bands are ideal for improving user data capacity for ultra-broadcast. Accordingly, it is desirable to have methods of extending high-frequency coverage to poorly-covered areas such as indoors.

Various methods of extending coverage are possible, but many of them have cost disadvantages in operation. For example, small cells can be deployed by operator only, and require skilled technicians. Such deployment needs high maintenance costs and is not optimal in areas outside urban. NR in unlicensed spectrum (NR-U) nodes can be deployed by operator, but can only support unlicensed bands. Integrated access backhauling (IAB) nodes also need to be deployed by operator and need high installation/maintenance cost. Wi-Fi base stations have no use of licensed bands and lack of seamless mobility. Therefore, better coverage enhancement solutions with low cost and easy installation/maintenance are desirable.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to UE-assisted coverage enhancement with respect to UE and network apparatus in mobile communications.

In one aspect, a method may involve an apparatus communicating with a network node via a first interface. The method may also involve the apparatus indicating to the network node a capability to function as a relay node. The method may further involve the apparatus communicating with a remote node via a second interface. The method may further involve the apparatus relaying a packet between the network node and the remote node via the first interface and the second interface.

In one aspect, a method may involve an apparatus communicating with a network node via a first interface. The method may also involve the apparatus communicating with a relay node via a second interface. The method may further involve the apparatus indicating to at least one of the network node and the relay node a capability to support a coverage enhancement via the relay node. The method may further involve the apparatus communicating a packet with the network node via the relay node.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT), Narrow Band Internet of Things (NB-IoT) and Industrial Internet of Things (IIoT), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Figure 1:
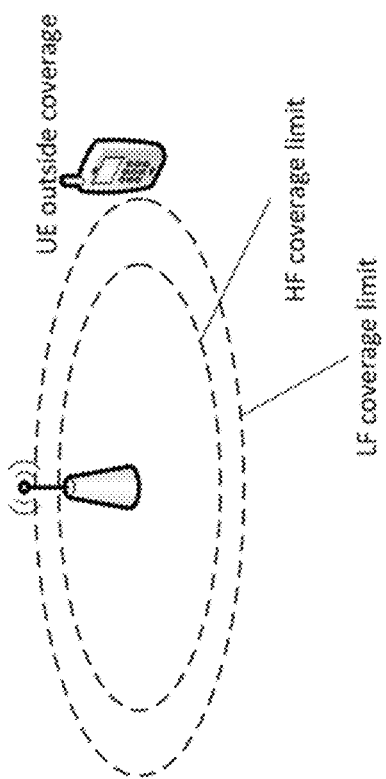
FIG. 1 is a diagram depicting example scenarios under schemes in accordance with implementations of the present disclosure.
Figure 1:
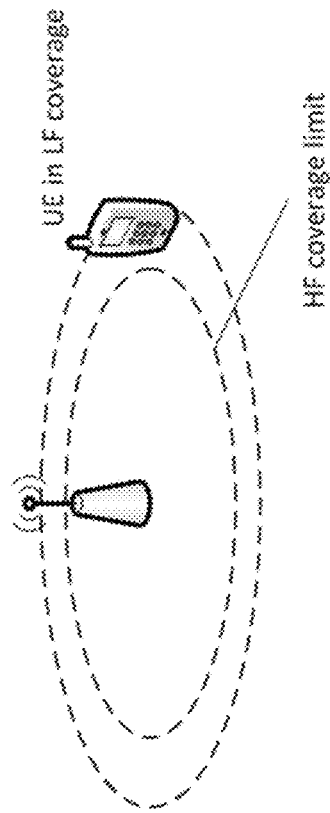

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to UE-assisted coverage enhancement with respect to UE and network apparatus in mobile communications. According to the present disclosure, a number of possible solutions may be implemented separately or jointly. That is, although these possible solutions may be described below separately, two or more of these possible solutions may be implemented in one combination or another.

Much of the spectrum made available for 5th generation (5G)/NR cellular operations is in medium-to-high frequencies, such as the so-called C-band (e.g., ~3.5-8 GHz), millimeter-wave spectrum (e.g., frequencies with wavelengths on the order of millimeters such as the range above ~24 GHz), and so on. The frequency bands above ~24 GHz and up to 52.6 GHz are also known in 3GPP parlance as Frequency Range 2 (FR2). As compared to cellular frequencies used in previous systems such as LTE, these frequencies experience high attenuation and have poor building penetration, resulting in limitations to coverage especially for indoor UEs. For example, over 10 dB propagation difference may occur between 1.8 GHz and 3.5 GHz, even larger for higher C-band frequencies. Therefore, there exist extremely challenges on outdoor to indoor penetration for high-frequency spectrum.

An indoor UE may experience relatively good coverage from a low-frequency band in the range used for cellular in previous generation systems, for instance, a band below ~3 GHz. Lower frequencies (e.g., up to ~6 GHz) are also known in 3GPP parlance as Frequency Range 1 (FR1). It is also noted that some frequencies in the higher range of FR1 may experience indoor penetration problems, and thus benefit from a means of coverage extension; that is, the existence of the indoor coverage problem is not just confined to FR2.

When a UE is covered by a low-frequency band, it can communicate with a cellular network using the low-frequency band. Low-frequency bands (e.g., around 700 MHz, 1.8 GHz) may experience lower penetration loss, but there is limited capacity available due to narrow transmission bandwidth. Thus, lower frequencies may provide coverage beyond higher frequencies, but may sacrifice some benefits of NR. Low-frequency bands offer comparatively narrow bandwidths and correspondingly low data rates as compared to high-frequency bands. High-frequency bands (e.g., C-band around 3-6 GHz, millimeter-wave at 28 GHz, etc.) offer much higher achievable capacity, but suffer from penetration loss through the air and/or building walls. Therefore, low-frequency bands are ideal for providing indoor coverage of control information, and high-frequency bands are ideal for improving user data capacity for ultra-broadcast. Accordingly, it is desirable to have methods of extending high-frequency coverage to poorly-covered areas such as indoors.

Various methods of extending coverage are possible, but many of them have cost disadvantages in operation. For instance, solutions using small cells to extend coverage have been explored, but a small cell requires skilled support from the network operator to install properly in a way that does not impair network operations (e.g., by generating unwanted interference towards neighboring cells). Similarly, the Integrated Access and Backhaul (IAB) work item in progress as part of 3GPP Release-16 promises to allow network nodes to extend coverage using wireless backhaul, thus avoiding some of the deployment costs of small cells, but IAB nodes are expected to be complex and expensive, resembling conventional cellular base stations, and may not be practical to deploy in large numbers as low-cost devices. They also require significant ongoing management effort from the network operator. In addition, IEEE 802.11 technologies (generally known as Wi-Fi) have been used to offer coverage extension, but they have the limitation of being able to operate only in unlicensed spectrum, and while they may support varying degrees of integration with the cellular network (e.g., voice call continuity), they cannot in general give the full benefit of the cellular service ecosystem regarding such features as seamless mobility and quality of service (QoS). Thus there is a need for a coverage-extension solution that can operate in licensed spectrum, with the benefits of integration into the cellular system, but without incurring excessive device, deployment, or operation costs.

FIG. 1 illustrates example scenarios under schemes in accordance with implementations of the present disclosure. Scenarios 101 and 102 may involve a UE and a network node, which may be a part of a wireless communication network (e.g., an LTE network, an LTE-Advanced network, an LTE-Advanced Pro network, a 5G network, an NR network, an IoT network, an NB-IoT network or an IIoT network). The coverage problem described above can result in two scenarios, as shown in scenarios 101 and 102. In scenarios 101, the UE is in coverage of the network node using one frequency band (e.g., a low frequency (LF) band) and out of coverage of the network node using another frequency band (e.g., a high frequency (HF) band). In scenarios 102, the UE is entirely out of coverage of the network node. Here the terms "low frequency" and "high frequency" should be understood as generalizations, not necessarily corresponding precisely to the 3GPP frequency ranges defined as FR1 and FR2. In particular, as noted above, some frequencies within FR1 may experience coverage problems and benefit from a coverage extension mechanism. Thus, the "HF" band in the figure may actually correspond to a first frequency within FR1 while the "LF" band may correspond to a second frequency within FR1, typically lower-frequency and offering better coverage as compared to the "HF" band. The "HF" band may comprise, for example and without limitation, a millimeter-wave frequency band. The present disclosure focuses on the scenarios 101, in which the UE experiences adequate coverage from the LF band but cannot directly benefit from the higher data rates of the HF band, and thus it is desirable to have a method of extending HF coverage to the concerned UE.

Figure 2:
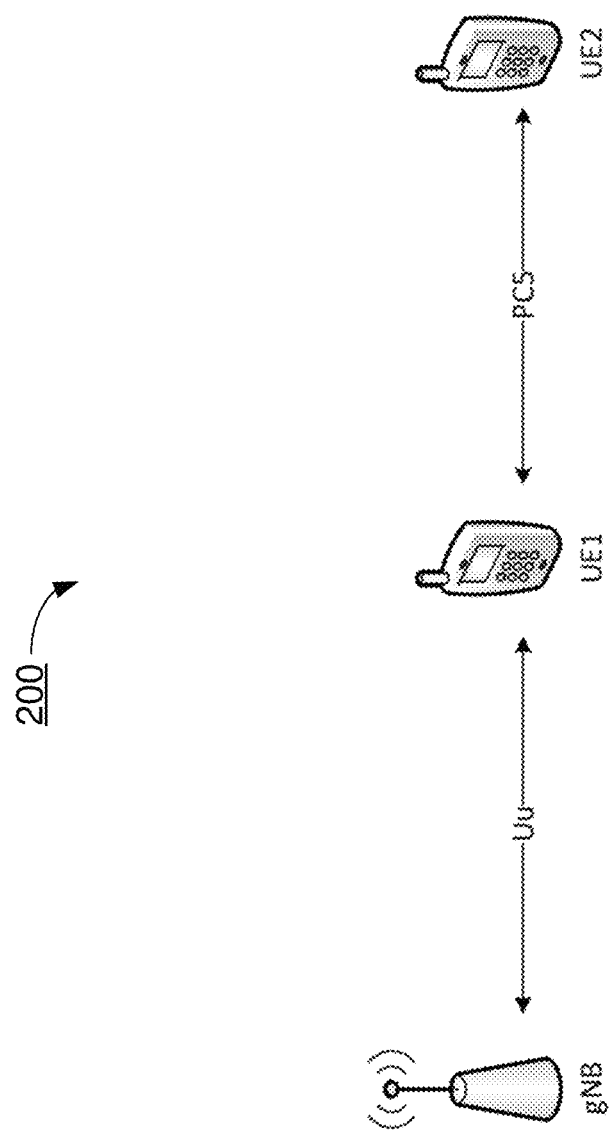
FIG. 2 is a diagram depicting an example scenario under schemes in accordance with implementations of the present disclosure.

3GPP LTE technology introduced an interface known as the "sidelink" that carries data directly between UEs, as opposed to communicating through a base station or other elements of the cellular network. The sidelink interface may also be referred to as a PC5 interface. Such interface typically operates in licensed spectrum, but it is also conceivable to adapt it for use in unlicensed spectrum. The PC5 interface is contrasted with the Uu interface between a UE and a base station, for example, a gNode B (gNB). FIG. 2 illustrates an example scenario under schemes in accordance with implementations of the present disclosure. Scenario 200 may involve a plurality of UEs and a network node, which may be a part of a wireless communication network. A UE may have access to both the Uu and PC5 interfaces, that is, it may operate while in coverage of a network node (e.g., gNB) using the Uu interface and also communicate directly with another UE (e.g., UE 2) using the PC5 interface. For the 5G/NR technology, a sidelink/PC5 interface is currently being specified, initially for the usage of vehicle-to-everything (V2X) communications, but with the potential to be reused for other applications in the future. The use of PC5 for additional applications may involve enhancements to the interface, or it may rely on the interface as defined for V2X operation, the latter allowing interoperation between V2X applications and future applications. For instance, a conventional cellular handset might interact with the V2X ecosystem as a pedestrian UE, while also supporting additional applications using PC5 for other purposes, such as the coverage extension techniques described herein.

In order to extend coverage for the benefit of UEs with coverage problems, such as indoor UEs, a relay node (e.g., a relay UE) is introduced. A first UE that can function to relay communications between a network node (e.g. a gNB) and a second UE known as a remote node (e.g., remote UE). The relay UE may communicate to the remote UE using the PC5 interface. A relay UE may not have the form factor of a typical cellular handset. It may be intended for semi-permanent installation in a location selected to optimize coverage, rather than being moved about freely by a user. However, it may still function as a UE in the sense that it communicates with a network node/base station using the Uu interface, and with one or more remote UEs using the PC5 interface.

Figure 3:
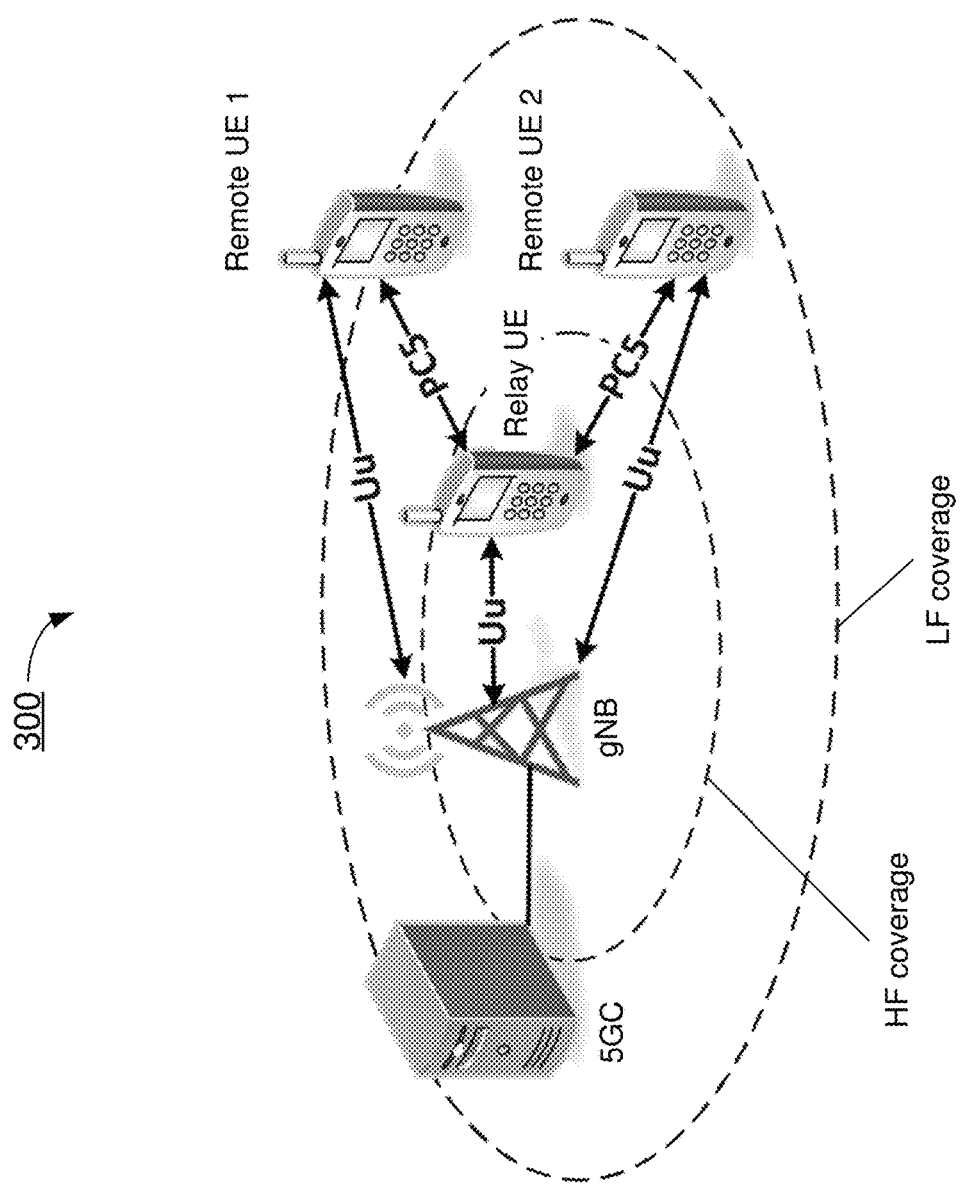
FIG. 3 is a diagram depicting an example scenario under schemes in accordance with implementations of the present disclosure.

FIG. 3 illustrates an example scenario under schemes in accordance with implementations of the present disclosure. Scenario 300 may involve a plurality of UEs and a network node, which may be a part of a wireless communication network. The remote UEs are in the coverage of the network node (e.g., gNB) using an LF frequency band, but out of coverage using an HF frequency band, while the relay UE is in coverage on the HF frequency band. A 5th generation core (5GC) is also shown in FIG. 3, but does not play any direct role in the relaying process, although it may be responsible for various functions such as authorizing the UEs (including the remote UEs) for service, routing user data to a termination point in the network, managing operations of the relay node, and so on.

The relay UE communicates with the gNB over a Uu interface, and with each of the remote UEs over a PC5 interface. Similarly, each remote UE communicates with the gNB over a Uu interface, and with the relay UE over a PC5 interface. However, the Uu interface may be used differently by the relay UE and the remote UEs. The Uu interface between the gNB and the relay UE, being carried over the HF frequency, can offer very high data rates, while the Uu interface between the gNB and the remote UEs, being carried over the LF frequency, offers only lower data rates. These lower data rates may be suitable for some purposes, for example, a control-plane signaling, which do not demand high data rates. For purposes such as the transfer of user-plane data, which would benefit from the high data rates of the HF layer, it may be desirable to use the relayed path, i.e., to communicate between the remote UEs and the relay UE via the PC5 interface and between the relay UE and the gNB via the (HF) Uu interface.

Specifically, from the relay node's point of view, the relay node may be configured to communicate with the network node via a first interface (e.g., Uu interface) and communicate with the remote node via a second interface (e.g., PC5 interface). The relay node may be recognized by the network node as a relay type of device. The relay node may be configured to indicate the network node a capability to function as a relay node. For example, a new UE capability message can be defined to help the relay node to indicate its relaying capability/functionality to the radio access network (RAN). The relay node may further be configured to receive a configuration authorizing it to function as the relay node. The communication between the relay node and the remote node may be responsive to an indication by the remote node of a coverage problem. The indication may be received by at least one of the relay node and the network node. The network node and/or the relay node may be triggered to perform the relay functionality in response to such indication by the remote node.

In some implementations, the relay node may require additional functionality than the remote node to configure and schedule resources for multiple remote nodes. For example, the configuration and scheduling decisions may be based on full network control wherein the relay node behavior is less complex. Alternatively, some configuration and scheduling decisions may be made by the relay node. For example, some resources/resource pools may be configured by the network node at the relay node. It may be up to the relay node to assign such resources to the remote nodes. Alternatively, the relay node may be expected to make more complex configuration and scheduling decisions. For example, autonomous dynamic resource allocation may be performed by the relay node. Such decisions and information on the remote node connected to the network via the relay node may still need to be shared with the network node.

The relay node may be configured to relay a packet between the network node and the remote node via the first interface and the second interface. Such relaying may comprise receiving a packet from the remote node via the second interface and transmitting the packet to the network node via the first interface, or receiving the packet from the network node via the first interface and transmitting the packet to the remote node via the second interface. The relay node may be configured to send/receive only user-plane packets or both user-plane and control-plane packets for remote node. The relay node may be configured to send/receive only uplink user traffic, only downlink user traffic or both uplink/downlink user traffic. The relay node may have different user-plane/control plane configurations for different remote nodes.

On the other hand, from the remote node's point of view, the remote node may be configured to communicate a network node via a first interface (e.g., Uu interface) and communicate with the relay node via a second interface (e.g., PC5 interface). The remote node experiencing coverage issue may be connected to a relay node for coverage enhancement. For example, a new UE capability may be defined for remote node to support coverage enhancement through a connection with another UE acting as a relay node. The remote node may be configured to indicate to at least one of the network node and the relay node a capability to support the coverage enhancement via the relay node. Then, the remote node may be able to communicate a packet with the network node via the relay node. The remote node may be configured to transmit an indication of a coverage problem to at least one of the network node and the relay node. The network node and/or the relay node may be triggered to perform the relay functionality in response to such indication by the remote node.

The remote mode experiencing coverage issue may be configured to communicate the control-plane signalling with the network node via the first interface and communicate the packet of user-plane data with the relay node via the second interface. The control-plane signalling on the link between the network node and the remote node may be configured on a low frequency band, and the packet of user-plane data on the link between the relay node and the remote node may be configured on a high frequency band. Alternatively, the remote mode experiencing coverage issue may be configured to communicate both the control-plane signalling and the packet of user-plane data with the network node via the first interface and communicate the packet of user-plane data with the relay node via the second interface. The packet of user-plane data on the link between the network node and the remote node may be configured for downlink user traffic only, and the packet of user-plane data on the link between the relay node and the remote node may be configured for uplink traffic only.

Figure 4:
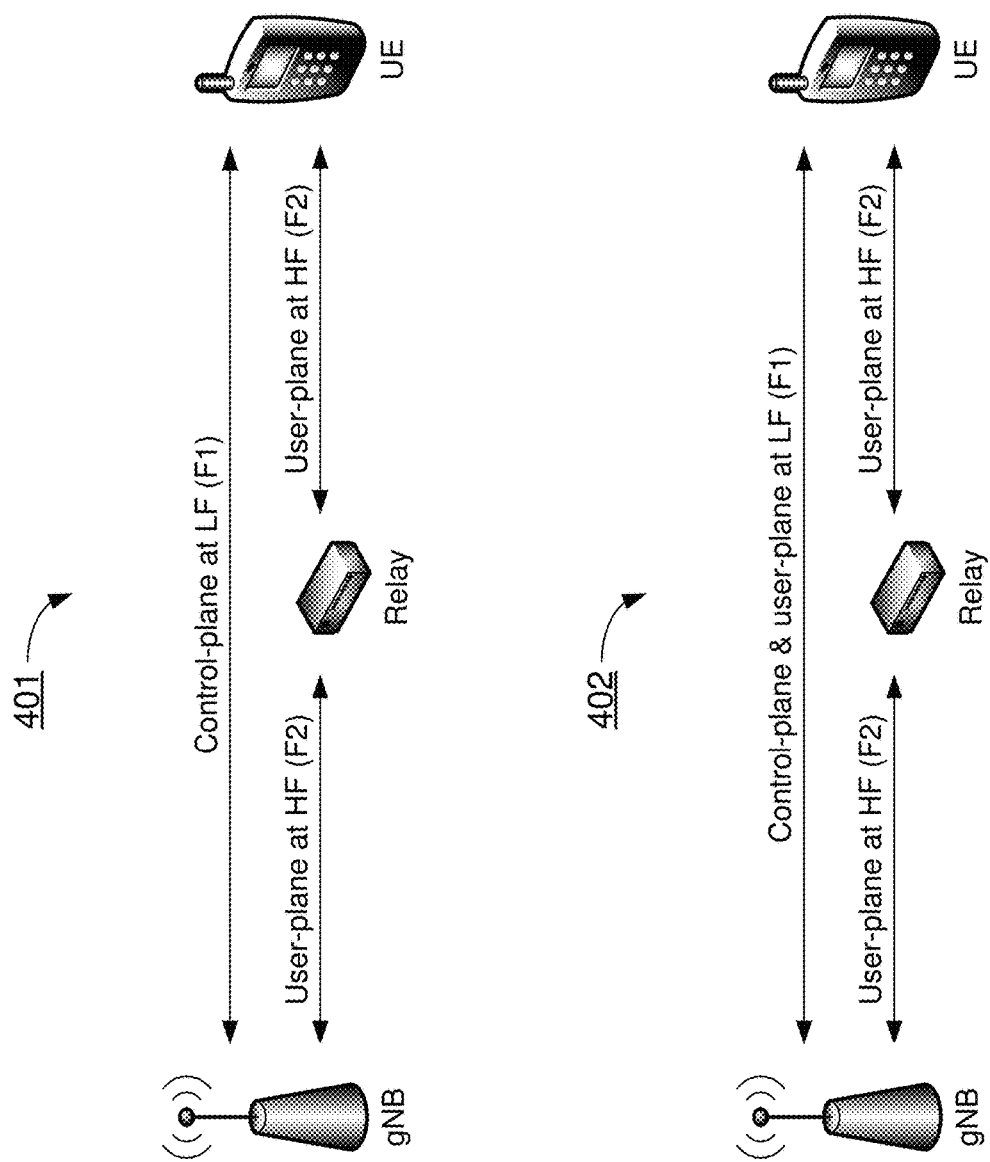
FIG. 4 is a diagram depicting example scenarios under schemes in accordance with implementations of the present disclosure.

FIG. 4 illustrates example scenarios under schemes in accordance with implementations of the present disclosure. Scenarios 401 and 402 may involve a UE, a relay node and a network node, which may be a part of a wireless communication network (e.g., an LTE network, an LTE-Advanced network, an LTE-Advanced Pro network, a 5G network, an NR network, an IoT network, an NB-IoT network or an IIoT network). In FIG. 4, the UE may be configured to communicate with the gNB at a low frequency band (e.g., F1) and communicate with the relay node at a high frequency band (e.g., F2). In scenario 401, the control-plane signaling and user-plane data may be received by the UE on different frequencies. The control-plane signaling may be sent from one transmit (Tx) point/node (e.g., gNB) to the UE on the low frequency band (e.g., F1) for wide coverage, and the user-plane data may be sent from another Tx point/node (e.g., relay) to the UE on the high frequency band (e.g., F2). The Tx point/node operating on the high frequency band (e.g., F2) may be a relay node, a repeater, or a UE acting as a relay device. The control-plane signaling may handle initial access, paging, connection/bearer establishment and management, mobility, and any other control signaling between the gNB and the UE. The user-plane data may handle transmission of downlink/uplink user traffic.

In scenario 402, some user-plane data may also be received by the UE on the low frequency band (e.g., F1). Both of the control-plane signaling and the user-plane data may be sent from one Tx point/node (e.g., gNB) to the UE on the low frequency band (F1) for wide coverage, and the user-plane data may further be sent from another Tx point/node to the UE on the high frequency band (e.g., F2). The Tx point/node operating on the high frequency band (e.g., F2) may be a relay node, a repeater, or a UE acting as a relay device. The control-plane signaling may handle initial access, paging, connection/bearer establishment and management, mobility, and any other control signaling between the gNB and the UE. The user-plane data may handle transmission of downlink/uplink user traffic. For example, the user-plane data on F1 may carry downlink user traffic while the user-plane data on F2 may carry uplink user traffic.

Figure 5:
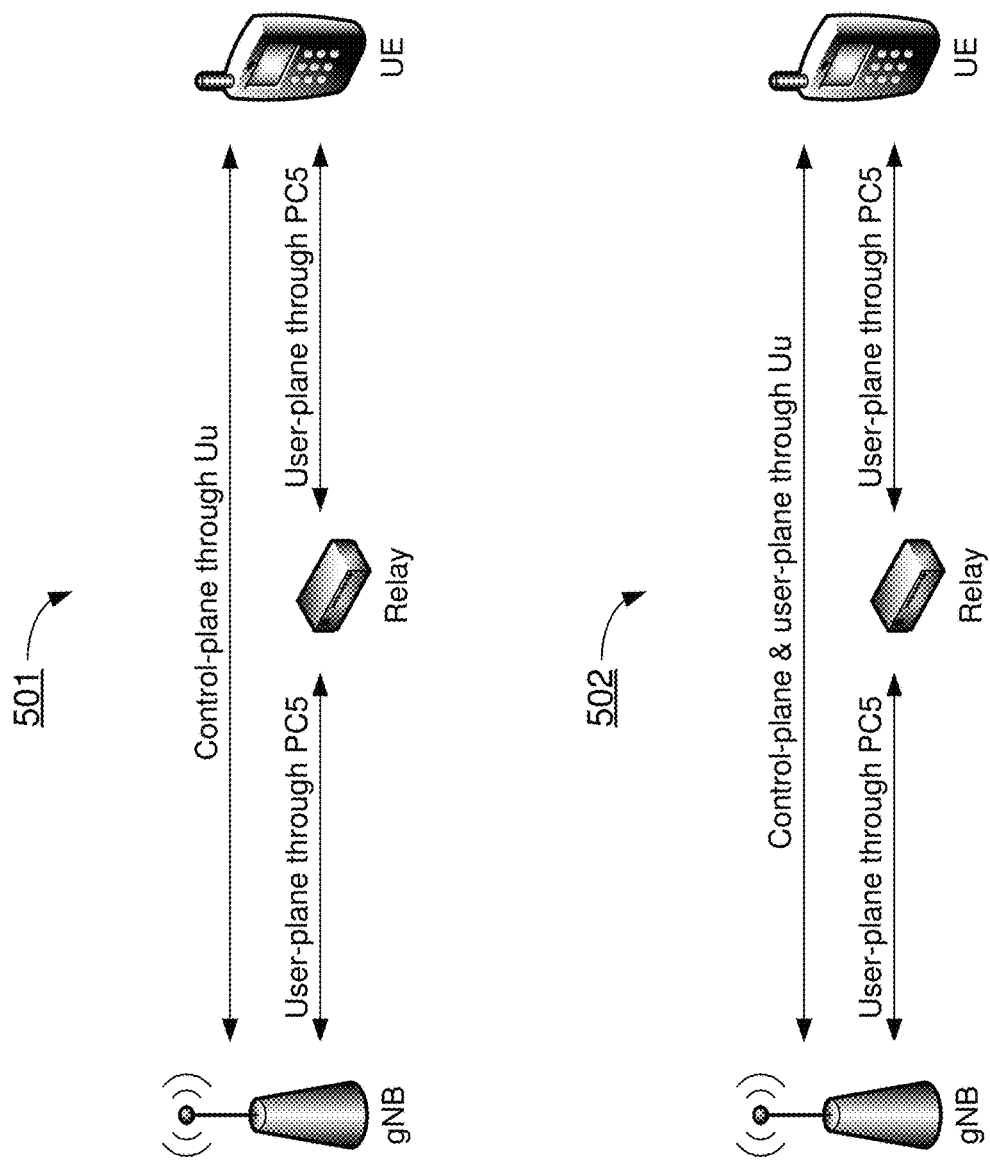
FIG. 5 is a diagram depicting example scenarios under schemes in accordance with implementations of the present disclosure.

FIG. 5 illustrates example scenarios under schemes in accordance with implementations of the present disclosure. Scenarios 501 and 502 may involve a UE, a relay node and a network node, which may be a part of a wireless communication network. In FIG. 5, the UE may be configured to communicate with the gNB through a first interface (e.g., Uu interface) and communicate with the relay node through a second interface (e.g., PC5 interface). In scenario 501, the control-plane signaling and user-plane data may be received by the UE through different interfaces. The control-plane signaling may be sent from one transmit (Tx) point/node (e.g., gNB) to the UE through the first interface (e.g., Uu interface), and the user-plane data may be sent from another Tx point/node (e.g., relay) to the UE through the second interface (e.g., PC5 interface). The Tx point/node sending the user-plane data through the second interface (e.g., PC5 interface) may be a relay node, a repeater, or a UE acting as a relay device. The control-plane signaling may handle initial access, paging, connection/bearer establishment and management, mobility, and any other control signaling between the gNB and the UE. The user-plane data may handle transmission of downlink/uplink user traffic.

In scenario 502, some user-plane data may also be received by the UE through the first interface (e.g., Uu interface). Both of the control-plane signaling and the user-plane data may be sent from one Tx point/node (e.g., gNB) to the UE through the first interface (e.g., Uu interface), and the user-plane data may further be sent from another Tx point/node to the UE through the second interface (e.g., PC5 interface). The Tx point/node sending the user-plane data through the second interface (e.g., PC5 interface) may be a relay node, a repeater, or a UE acting as a relay device. The control-plane signaling may handle initial access, paging, connection/bearer establishment and management, mobility, and any other control signaling between the gNB and the UE. The user-plane data may handle transmission of downlink/uplink user traffic. For example, the user-plane data through the Uu interface may carry downlink user traffic while the user-plane data through the PC5 interface may carry uplink user traffic.

The foregoing scenarios assumes that the PC5 interface itself can offer high data rates. Accordingly, it may be beneficial for the PC5 interface to operate at a high frequency where transmissions can occupy a large bandwidth and in general use a numerology compatible with high data rates. In some embodiments, the frequency used by the PC5 interface may be the same as the HF frequency used by the Uu interface between the relay UE and the gNB. In other embodiments, the PC5 interface may operate on a different frequency from the Uu interface between the relay UE and the gNB. These operating frequencies may be in licensed spectrum, unlicensed spectrum, or a combination thereof.

In some implementations, since the control-plane signaling (e.g., control messages that relate to the configuration of the UE, its connection with the network, and so on) may not demand a high data rate, it may therefore be suitable for direct communication over the Uu interface, even on the lower-data-rate LF layer. This may result in a relaying design where the user plane is relayed while the control plane is carried directly. This scenario may lead to the gNB maintaining a UE context for the remote UE, to allow configuration of the remote UE by, for example, a radio resource control (RRC) protocol. In other words, the gNB may maintain the remote UE in an RRC_CONNECTED state, using control signaling carried directly over the Uu interface. In some scenarios, the remote UE may also support operation in an RRC_IDLE state on the Uu interface, either with or without a simultaneous connection over the PC5 interface to the relay UE. As one example, the remote UE may operate or "camp" in an RRC_IDLE state on the gNB until it receives a paging message instructing it to transfer to a connected mode (e.g., an RRC_CONNECTED state), at which time it may establish a connection over the PC5 interface with the relay UE to support the transfer of user-plane data while in the connected mode. As another example, the remote UE may establish a connection over the PC5 interface with the relay UE only when instructed to do so by the gNB. The PC5 interface may or may not have its own associated state. For example, the PC5 interface may have an associated state machine in the remote UE which is separate from the state machine for the Uu interface, so that the remote UE may be in a connected mode on the PC5 interface while in an idle mode on the Uu interface, or vice versa.

In some embodiments, user-plane data packets may be relayed in only a single direction. For instance, in an event that the coverage is worse in the uplink direction than the downlink direction, it may be that the direct downlink on the Uu interface can support the needed data rate, but the direct uplink on the Uu interface cannot. In such a case, data sent in the uplink from a remote UE may be relayed through the relay UE, while data sent in the downlink direction to the remote UE may be delivered directly on the Uu interface.

Figure 6:
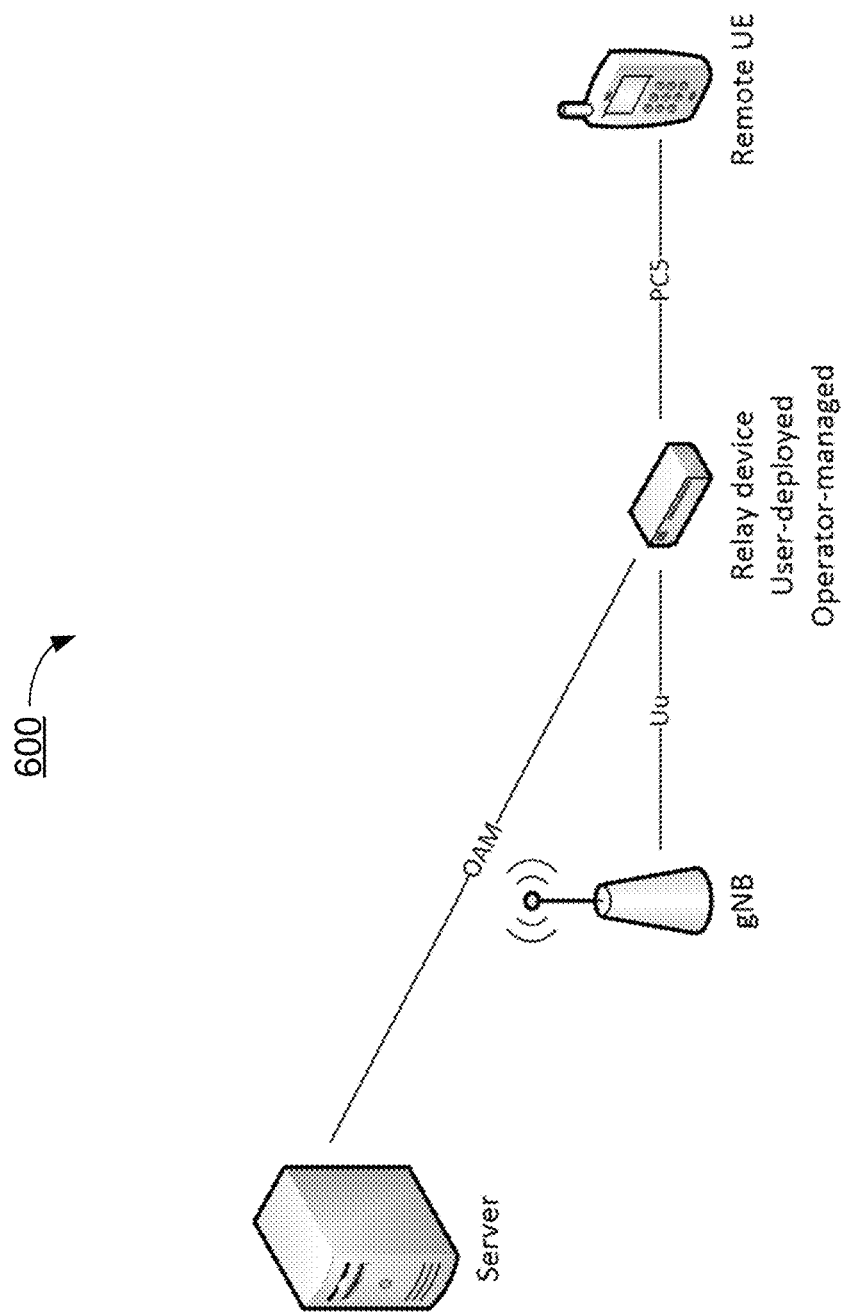
FIG. 6 is a diagram depicting an example scenario under schemes in accordance with implementations of the present disclosure.

In some implementations, the relay UE may have a different form factor from a typical cellular handset. It may, for example and without limitation, be a customer premises equipment (CPE) device, whose form factor may be similar to a server, a router, a set-top box, and so on. The relay UE may be deployed by a user, but subsequently managed by an operator, for such functions as authorization, interference management, etc. FIG. 6 illustrates an example scenario under schemes in accordance with implementations of the present disclosure. Scenario 600 may involve a UE, a relay node, a network node and a server, which may be a part of a wireless communication network. FIG. 6 illustrates a possible architecture for this approach. The operator management may be under the control of a server, which may, for example, be an element of the 5GC. The server, or other controlling network element, may communicate with the relay UE via an Operation, Administration, and Maintenance (OAM) interface. Signaling on this interface may be carried to the relay UE in various ways, but the "last leg" of communication from the server to the relay UE may be expected to be over the Uu interface from the gNB to the relay UE. Thus, the OAM traffic should be carried by the protocol layers of the Uu interface. As one example, OAM traffic may be delivered to the relay UE as user-plane data directed to a particular application on the relay UE. In some embodiments, OAM traffic may be carried as signaling instead of as user-plane data.

Figure 7:
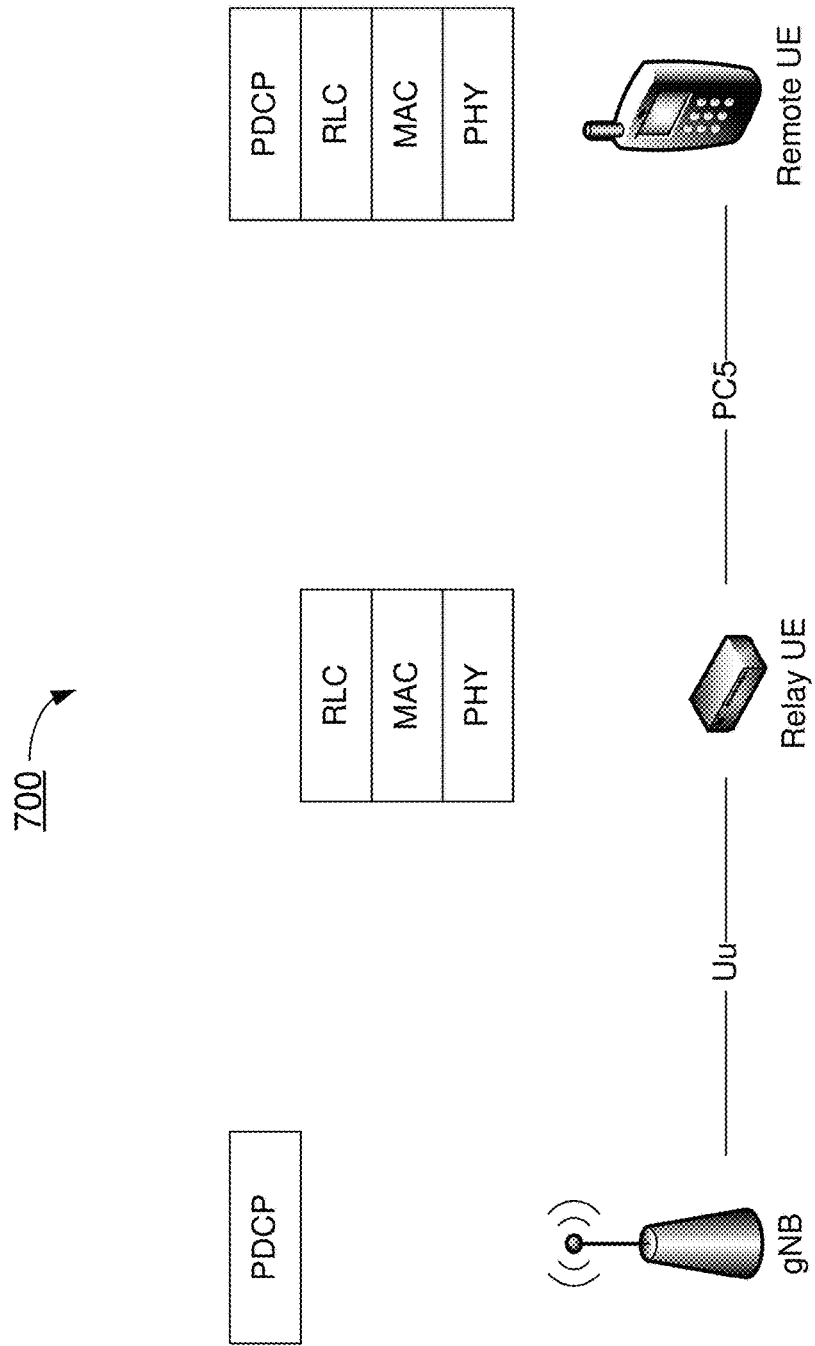
FIG. 7 is a diagram depicting an example scenario under schemes in accordance with implementations of the present disclosure.

The relaying function may be supported by various designs of protocol stacks. One possible example, which may be described as layer 2 (L2) relaying, is shown in FIG. 7. FIG. 7 illustrates an example scenario under schemes in accordance with implementations of the present disclosure. Scenario 700 may involve a UE, a relay node and a network node, which may be a part of a wireless communication network. In this example, the remote UE may include a protocol stack comprising a physical (PHY) layer, a medium access control (MAC) layer, a radio link control (RLC) layer, and a packet data convergence protocol (PDCP) layer. Other protocol layers may exist beyond those shown in the figure. The PHY, MAC, and RLC layers may be terminated between the remote UE and the relay UE, while the PDCP layer may be terminated between the remote UE and the gNB. This split protocol stack allows the functions of PDCP, including, for example, security management, to be managed between the remote UE and the gNB, without depending on the relay UE. On the other hand, the lower layers (e.g., RLC, MAC, and PHY), which are directed more closely to the maintenance of communication over the radio link, may benefit from being terminated directly between the remote UE and the relay UE, so that they can manage communication over the PC5 interface with maximum efficiency and/or minimum latency. The PDCP termination point in the gNB may be part of an RRC context maintained for the remote UE.

Figure 8:
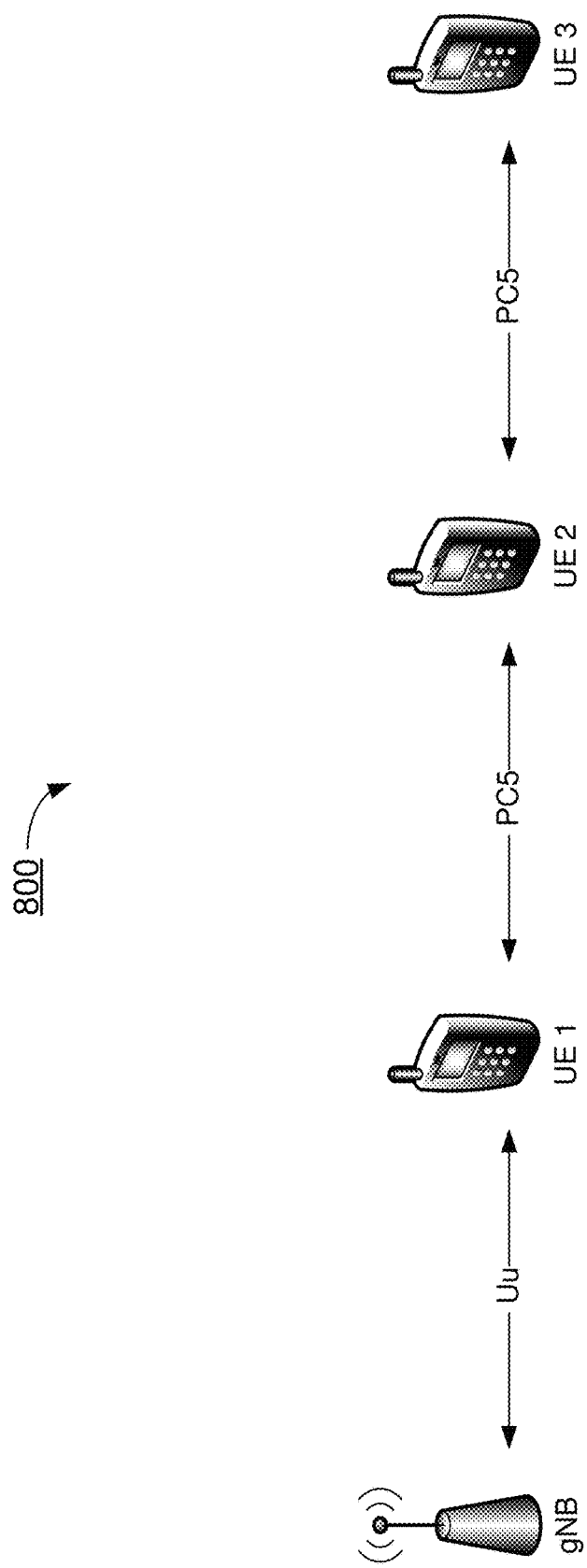
FIG. 8 is a diagram depicting an example scenario under schemes in accordance with implementations of the present disclosure.

In some embodiments, one or more of the remote UEs may itself function as a relay UE serving additional remote UEs. FIG. 8 illustrates an example scenario under schemes in accordance with implementations of the present disclosure. Scenario 800 may involve a plurality of UEs and a network node, which may be a part of a wireless communication network. Here UE 1 is a relay UE connected via Uu interface to the gNB, and UE 2 is a first remote UE connected via PC5 interface to UE 1. In addition, UE 3 is a second remote UE connected via PC5 interface to UE 2. UE 3 may be in coverage of the gNB on the low frequency band and out of coverage of the gNB on the high frequency band, or may be entirely out of coverage of the gNB. So that, for example, user-plane traffic from UE 3 may be delivered first to UE 2 via PC5 interface, then to UE 1 via PC5 interface from UE 2, and finally to the gNB via Uu interface from UE 1. Such a multi-hop arrangement may be beneficial in case UE 3 has limited visibility to UE 1. From UE 1's point of view, UE 1 may be configured to receive a packet of user-plane data from the gNB and transmit the packet of user-plane data to UE 2. From UE 2's point of view, UE 2 may be configured to receive the packet of user-plane data from UE 1 and transmit the packet of user-plane data to UE 3. The additional hop through UE 2 may add some latency to the delivery of data, but may allow higher data rates than direct communication with UE 1 would support, or may allow connectivity when UE 3 cannot establish direct communication with UE 1 at all. In such a multi-hop setting, the various embodiments described above may still apply. For instance, the control plane signaling may be delivered directly from the gNB to UE 3 on the Uu interface, user-plane traffic may be relayed for UE 3 in both directions or only in one direction (e.g. the uplink), and so on.

Illustrative Implementations

Figure 9:
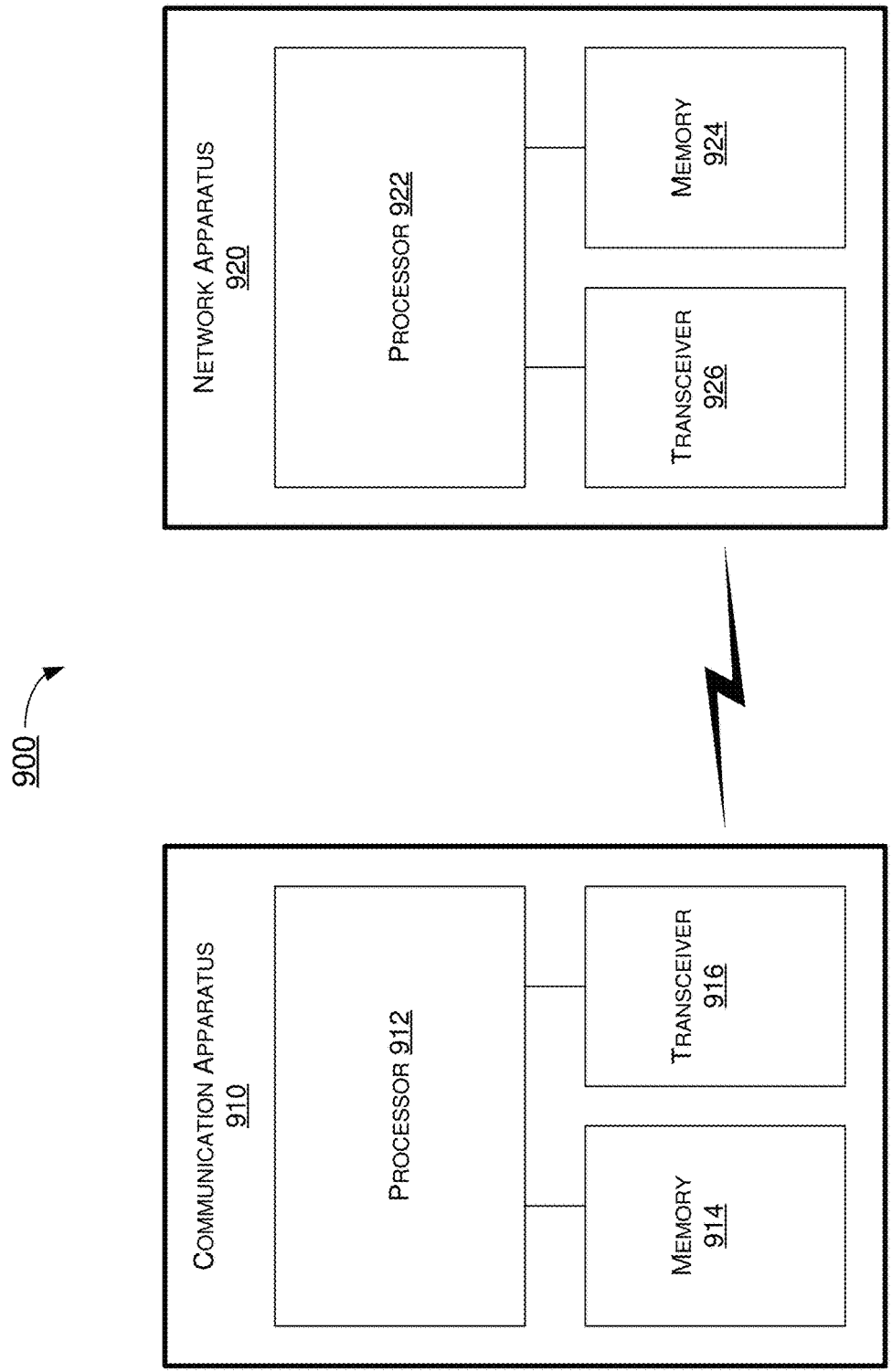
FIG. 9 is a block diagram of an example communication apparatus and an example network apparatus in accordance with an implementation of the present disclosure.

FIG. 9 illustrates an example communication apparatus 910 and an example network apparatus 920 in accordance with an implementation of the present disclosure. Each of communication apparatus 910 and network apparatus 920 may perform various functions to implement schemes, techniques, processes and methods described herein pertaining to UE-assisted coverage enhancement with respect to UE and network apparatus in wireless communications, including scenarios/mechanisms described above as well as processes 1000 and 1100 described below.

Communication apparatus 910 may be a part of an electronic apparatus, which may be a UE such as a portable or mobile apparatus, a wearable apparatus, a wireless communication apparatus or a computing apparatus. For instance, communication apparatus 910 may be implemented in a smartphone, a smartwatch, a personal digital assistant, a digital camera, or a computing equipment such as a tablet computer, a laptop computer or a notebook computer. Communication apparatus 910 may also be a part of a machine type apparatus, which may be an IoT, NB-IoT, or IIoT apparatus such as an immobile or a stationary apparatus, a home apparatus, a wire communication apparatus or a computing apparatus. For instance, communication apparatus 910 may be implemented in a smart thermostat, a smart fridge, a smart door lock, a wireless speaker or a home control center. Alternatively, communication apparatus 910 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 910 may include at least some of those components shown in FIG. 9 such as a processor 912, for example. communication apparatus 910 may further include one or more other components not pertinent to the proposed scheme of the present disclosure (e.g., internal power supply, display device and/or user interface device), and, thus, such component(s) of communication apparatus 910 are neither shown in FIG. 9 nor described below in the interest of simplicity and brevity.

Network apparatus 920 may be a part of an electronic apparatus, which may be a network node such as a base station, a small cell, a router or a gateway. For instance, network apparatus 920 may be implemented in an eNodeB in an LTE, LTE-Advanced or LTE-Advanced Pro network or in a gNB in a 5G, NR, IoT, NB-IoT or IIoT network. Alternatively, network apparatus 920 may be implemented in the form of one or more IC chips such as, for example and without limitation, one or more single-core processors, one or more multi-core processors, or one or more RISC or CISC processors. Network apparatus 920 may include at least some of those components shown in FIG. 9 such as a processor 922, for example. Network apparatus 920 may further include one or more other components not pertinent to the proposed scheme of the present disclosure (e.g., internal power supply, display device and/or user interface device), and, thus, such component(s) of network apparatus 920 are neither shown in FIG. 9 nor described below in the interest of simplicity and brevity.

In one aspect, each of processor 912 and processor 922 may be implemented in the form of one or more single-core processors, one or more multi-core processors, or one or more CISC processors. That is, even though a singular term "a processor" is used herein to refer to processor 912 and processor 922, each of processor 912 and processor 922 may include multiple processors in some implementations and a single processor in other implementations in accordance with the present disclosure. In another aspect, each of processor 912 and processor 922 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 912 and processor 922 is a special-purpose machine specifically designed, arranged and configured to perform specific tasks including power consumption reduction in a device (e.g., as represented by communication apparatus 910) and a network (e.g., as represented by network apparatus 920) in accordance with various implementations of the present disclosure.

In some implementations, communication apparatus 910 may also include a transceiver 916 coupled to processor 912 and capable of wirelessly transmitting and receiving data. In some implementations, communication apparatus 910 may further include a memory 914 coupled to processor 912 and capable of being accessed by processor 912 and storing data therein. In some implementations, network apparatus 920 may also include a transceiver 926 coupled to processor 922 and capable of wirelessly transmitting and receiving data. In some implementations, network apparatus 920 may further include a memory 924 coupled to processor 922 and capable of being accessed by processor 922 and storing data therein. Accordingly, communication apparatus 910 and network apparatus 920 may wirelessly communicate with each other via transceiver 916 and transceiver 926, respectively. To aid better understanding, the following description of the operations, functionalities and capabilities of each of communication apparatus 910 and network apparatus 920 is provided in the context of a mobile communication environment in which communication apparatus 910 is implemented in or as a communication apparatus or a UE and network apparatus 920 is implemented in or as a network node of a communication network.

In some implementations, communication apparatus 910 may act as a relay node. Processor 912 may be configured to communicate, via transceiver 916, with network apparatus 920 via a first interface (e.g., Uu interface) and communicate, via transceiver 916, with a remote node via a second interface (e.g., PC5 interface). Communication apparatus 910 may be recognized by network apparatus 920 node as a relay type of device. Processor 912 may be configured to indicate network apparatus 920 a capability to function as a relay node. For example, a new UE capability message can be defined to help processor 912 to indicate its relaying capability/functionality to network apparatus 920. Processor 912 may further be configured to receive, via transceiver 916, a configuration authorizing it to function as the relay node. The communication between communication apparatus 910 and the remote node may be responsive to an indication by the remote node of a coverage problem. The indication may be received by at least one of communication apparatus 910 and network apparatus 920. The network apparatus 920 and/or communication apparatus 910 may be triggered to perform the relay functionality in response to such indication by the remote node.

In some implementations, communication apparatus 910 may require additional functionality than the remote node to configure and schedule resources for multiple remote nodes. For example, the configuration and scheduling decisions may be based on full network control wherein the communication apparatus behavior is less complex. Alternatively, some configuration and scheduling decisions may be made by communication apparatus 910. For example, some resources/resource pools may be configured by network apparatus 920 at communication apparatus 910. It may be up to communication apparatus 910 to assign such resources to the remote nodes. Alternatively, communication apparatus 910 may be expected to make more complex configuration and scheduling decisions. For example, autonomous dynamic resource allocation may be performed by communication apparatus 910. Such decisions and information on the remote node connected to the network via communication apparatus 910 may still need to be shared with network apparatus 920.

In some implementations, processor 912 may be configured to relay a packet between network apparatus 920 and the remote node via the first interface and the second interface. Such relaying may comprise receiving, via transceiver 916, a packet from the remote node via the second interface and transmitting, via transceiver 916, the packet to network apparatus via the first interface, or receiving, via transceiver 916, the packet from network apparatus 920 via the first interface and transmitting, via transceiver 916, the packet to the remote node via the second interface. Processor 912 may be configured to send/receive, via transceiver 916, only user-plane packets or both user-plane and control-plane packets for remote node. Processor 912 may be configured to send/receive, via transceiver 916, only uplink user traffic, only downlink user traffic or both uplink/downlink user traffic. Processor 912 may have different user-plane/control plane configurations for different remote nodes.

In some implementations, communication apparatus 910 may act as a remote node. Communication apparatus 910 may be configured to communicate network apparatus 920 via a first interface (e.g., Uu interface) and communicate with a relay node via a second interface (e.g., PC5 interface). Communication apparatus 910 may be connected to a relay node for coverage enhancement. For example, a new UE capability may be defined for communication apparatus 910 to support coverage enhancement through a connection with another UE acting as a relay node. Processor 912 may be configured to indicate to at least one of network apparatus 920 and the relay node a capability to support the coverage enhancement via the relay node. Then, communication apparatus 910 may be able to communicate a packet with network apparatus 920 via the relay node. Processor 912 may be configured to transmit, via transceiver 916, an indication of a coverage problem to at least one of network apparatus 920 and the relay node. Network apparatus 920 and/or the relay node may be triggered to perform the relay functionality in response to such indication by communication apparatus 910.

In some implementations, processor 912 may be configured to communicate the control-plane signalling with network apparatus via the first interface and communicate the packet of user-plane data with the relay node via the second interface. The control-plane signalling on the link between network apparatus 920 and communication apparatus 910 may be configured on a low frequency band, and the packet of user-plane data on the link between the relay node and communication apparatus 910 may be configured on a high frequency band. Alternatively, processor 912 may be configured to communicate both the control-plane signalling and the packet of user-plane data with network apparatus 920 via the first interface and communicate the packet of user-plane data with the relay node via the second interface. The packet of user-plane data on the link between network apparatus 920 and communication apparatus 910 may be configured for downlink user traffic only, and the packet of user-plane data on the link between the relay node and communication apparatus 910 may be configured for uplink traffic only.

In some implementations, processor 912 may be configured to communicate with network apparatus 920 at a low frequency band and communicate with the relay node at a high frequency band. Processor 912 may be configured to receive, via transceiver 916, the control-plane signaling and user-plane data on different frequencies. Processor 912 may receive the control-plane signaling from network apparatus 920 on the low frequency band for wide coverage and receive the user-plane data the relay node on the high frequency band.

In some implementations, processor 912 may be configured to receive some user-plane data on the low frequency band. Processor 912 may receive both of the control-plane signaling and the user-plane data from network apparatus 920 on the low frequency band for wide coverage and receive the user-plane data from the relay node on the high frequency band. Processor 912 may receive the user-plane data on the low frequency band for downlink user traffic and transmit the user-plane data on the high frequency band for uplink user traffic.

In some implementations, processor 912 may be configured to communicate with network apparatus 920 through a first interface (e.g., Uu interface) and communicate with the relay node through a second interface (e.g., PC5 interface). Processor 912 may receive the control-plane signaling and user-plane data through different interfaces. Processor 912 may receive the control-plane signaling from network apparatus 920 through the first interface (e.g., Uu interface) and receive the user-plane data from the relay node through the second interface (e.g., PC5 interface).

In some implementations, processor 912 may be configured to receive some user-plane data through the first interface (e.g., Uu interface). Processor 912 may receive both of the control-plane signaling and the user-plane data from network apparatus 920 through the first interface (e.g., Uu interface) and receive the user-plane data from the relay node through the second interface (e.g., PC5 interface). Processor 912 may receive the user-plane data through the Uu interface for downlink user traffic and transmit the user-plane data through the PC5 interface for uplink user traffic.

Illustrative Processes

Figure 10:
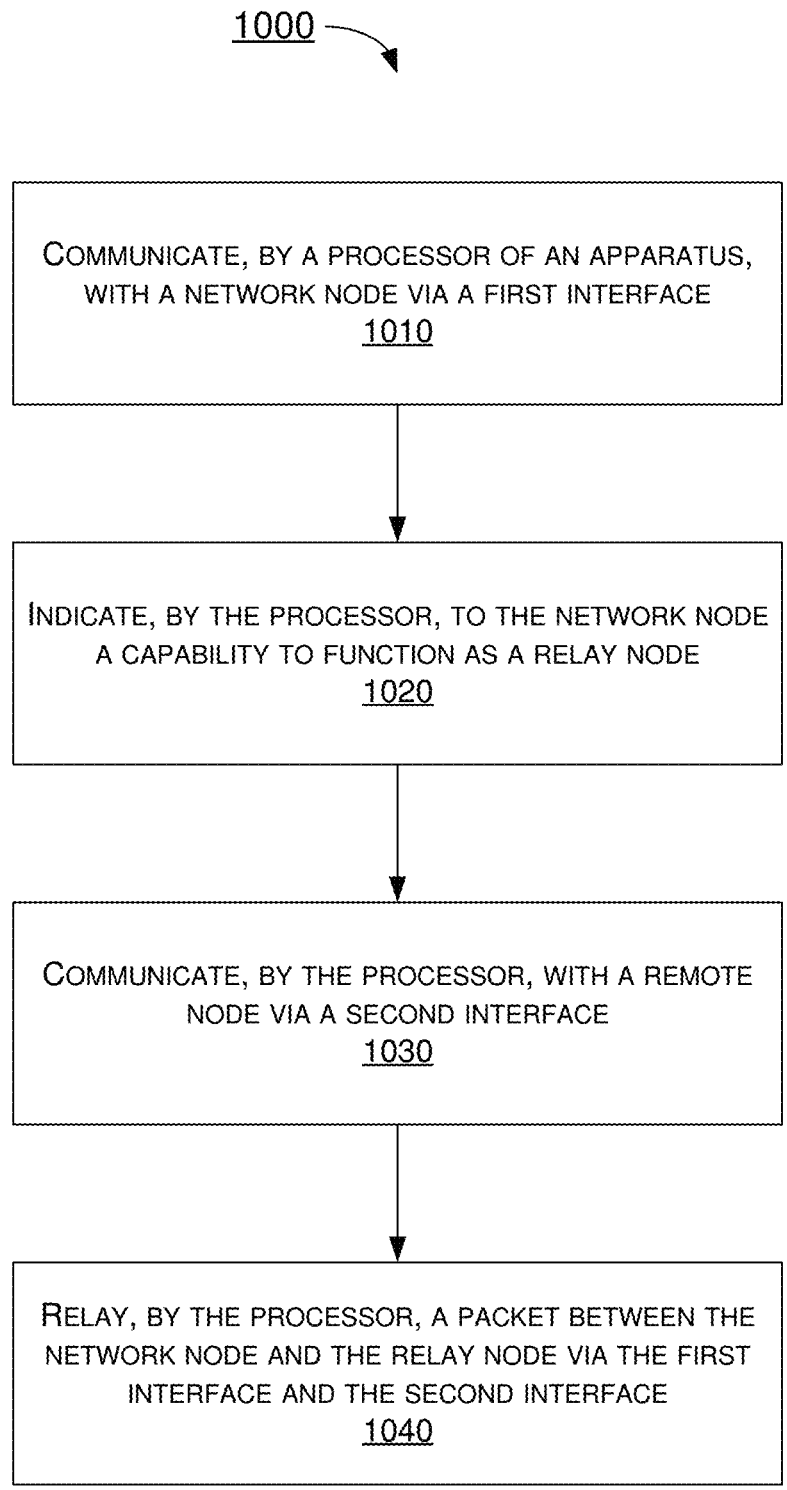
FIG. 10 is a flowchart of an example process in accordance with an implementation of the present disclosure.

FIG. 10 illustrates an example process 1000 in accordance with an implementation of the present disclosure. Process 1000 may be an example implementation of above scenarios/schemes, whether partially or completely, with respect to UE-assisted coverage enhancement with the present disclosure. Process 1000 may represent an aspect of implementation of features of communication apparatus 910. Process 1000 may include one or more operations, actions, or functions as illustrated by one or more of blocks 1010, 1020, 1030 and 1040. Although illustrated as discrete blocks, various blocks of process 1000 may be divided into additional blocks, combined into fewer blocks, or eliminated, depending on the desired implementation. Moreover, the blocks of process 1000 may executed in the order shown in FIG. 10 or, alternatively, in a different order. Process 1000 may be implemented by communication apparatus 910 or any suitable UE or machine type devices. Solely for illustrative purposes and without limitation, process 1000 is described below in the context of communication apparatus 910. Process 1000 may begin at block 1010.

At 1010, process 1000 may involve processor 912 of apparatus 910 communicating with a network node via a first interface. Process 1000 may proceed from 1010 to 1020.

At 1020, process 1000 may involve processor 912 indicating to the network node a capability to function as a relay node. Process 1000 may proceed from 1020 to 1030.

At 1030, process 1000 may involve processor 912 communicating with a remote node via a second interface. Process 1000 may proceed from 1030 to 1040.

At 1040, process 1000 may involve processor 912 relaying a packet between the network node and the remote node via the first interface and the second interface.

In some implementations, the first interface may comprise a Uu interface. The second interface may comprise a PC5 interface.

In some implementations, process 1000 may involve processor 912 receiving a packet of user-plane data from the remote node and transmitting the packet of user-plane data to the network node. Process 1000 may also involve processor 912 receiving the packet of user-plane data from the network node and transmitting the packet of user-plane data to the remote node.

In some implementations, process 1000 may involve processor 912 communicating with the remote node on a first frequency band. The remote node may communicate with the network node on a second frequency band different from the first frequency band.

In some implementations, the first frequency band may comprise a millimeter-wave frequency band.

In some implementations, the remote node may be out of coverage of the network node on first frequency band. The remote node may be in coverage of the network node on the second frequency band.

In some implementations, the remote node may communicate a control-plane signalling with the network node on the second frequency band.

In some implementations, the remote node may communicate a control-plane signalling with the network node via the first interface.

In some implementations, process 1000 may involve processor 912 receiving a configuration authorizing the apparatus to function as the relay node.

In some implementations, the communicating with the remote node may be responsive to an indication by the remote node of a coverage problem.

Figure 11:
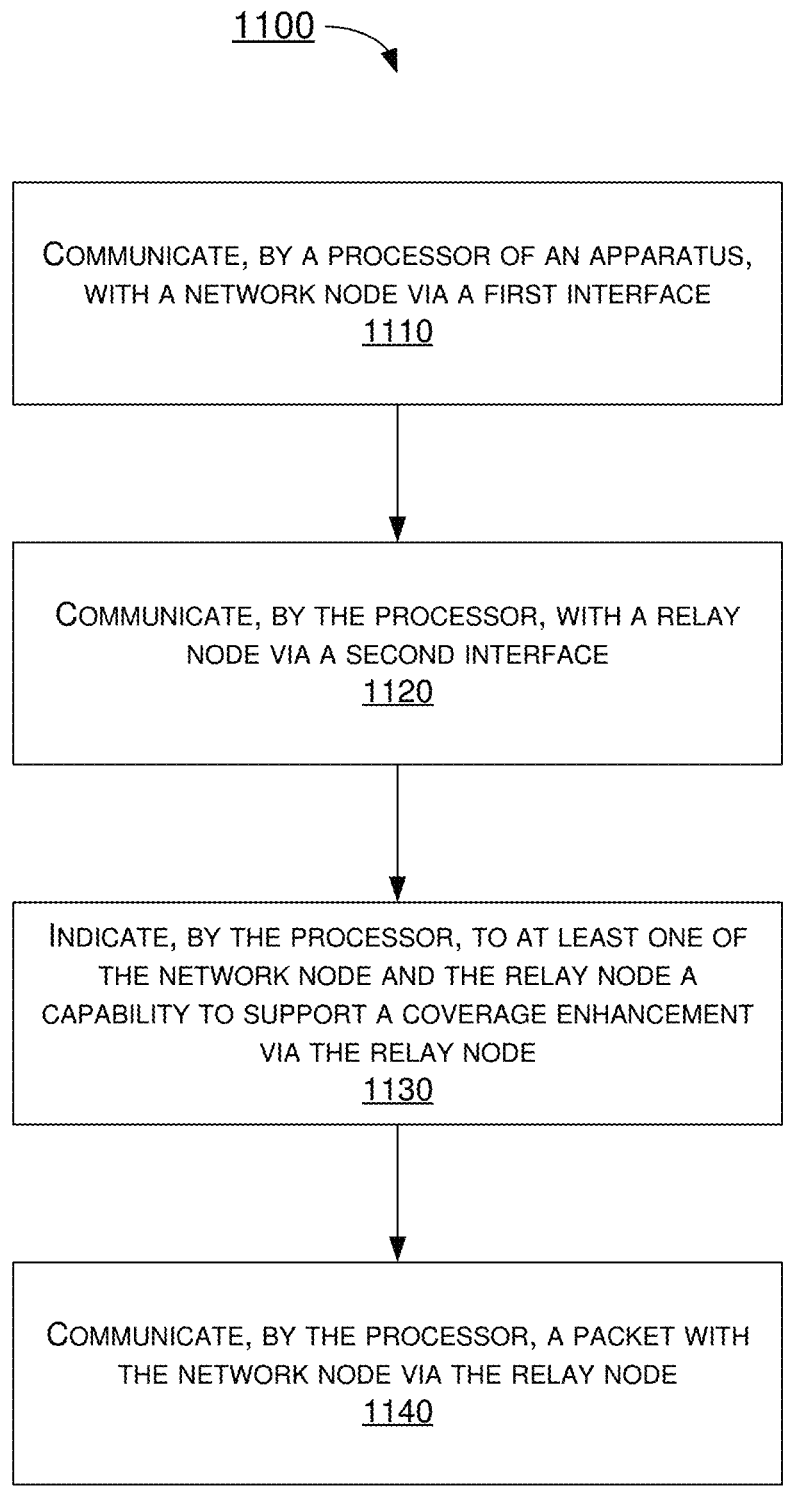
FIG. 11 is a flowchart of an example process in accordance with an implementation of the present disclosure.

FIG. 11 illustrates an example process 1100 in accordance with an implementation of the present disclosure. Process 1100 may be an example implementation of above scenarios/schemes, whether partially or completely, with respect to UE-assisted coverage enhancement with the present disclosure. Process 1100 may represent an aspect of implementation of features of communication apparatus 910. Process 1100 may include one or more operations, actions, or functions as illustrated by one or more of blocks 1110, 1120, 1130 and 1140. Although illustrated as discrete blocks, various blocks of process 1100 may be divided into additional blocks, combined into fewer blocks, or eliminated, depending on the desired implementation. Moreover, the blocks of process 1100 may executed in the order shown in FIG. 11 or, alternatively, in a different order. Process 1100 may be implemented by communication apparatus 910 or any suitable UE or machine type devices. Solely for illustrative purposes and without limitation, process 1100 is described below in the context of communication apparatus 910. Process 1100 may begin at block 1110.

At 1110, process 1100 may involve processor 912 of apparatus 910 communicating with a network node via a first interface. Process 1100 may proceed from 1110 to 1120.

At 1120, process 1100 may involve processor 912 communicating with a relay node via a second interface. Process 1100 may proceed from 1120 to 1130.

At 1130, process 1100 may involve processor 912 indicating to at least one of the network node and the relay node a capability to support a coverage enhancement via the relay node. Process 1100 may proceed from 1130 to 1140.

At 1140, process 1100 may involve processor 912 communicating a packet with the network node via the relay node.

In some implementations, the first interface may comprise a Uu interface. The second interface may comprise a PC5 interface.

In some implementations, process 1100 may involve processor 912 communicating a control-plane signalling with the network node via the first interface. Process 1100 may also involve processor 912 communicating a packet of user-plane data with the relay node via the second interface.

In some implementations, process 1100 may involve processor 912 communicating a control-plane signalling and a packet of user-plane data with the network node via the first interface. Process 1100 may also involve processor 912 communicating the packet of user-plane data with the relay node via the second interface.

In some implementations, process 1100 may involve processor 912 communicating with the relay node on a first frequency band. Process 1100 may also involve processor 912 communicating with the network node on a second frequency band different from the first frequency band.

In some implementations, the first frequency band may comprise a millimeter-wave frequency band.

In some implementations, the apparatus may be out of coverage of the network node on first frequency band. The apparatus may be in coverage of the network node on the second frequency band.

In some implementations, process 1100 may involve processor 912 transmitting an indication of a coverage problem to at least one of the network node and the relay node.

In some implementations, process 1100 may involve processor 912 communicating a remote node via the second interface. Process 1100 may also involve processor 912 relaying the packet between the relay node and the remote node via the second interface.

In some implementations, process 1100 may involve processor 912 receiving a packet of user-plane data from the relay node and transmitting the packet of user-plane data to the remote node. Process 1100 may also involve processor 912 receiving the packet of user-plane data from the remote node and transmitting the packet of user-plane data to the relay node.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
communicating, by a processor of an apparatus, with a network node via a first interface;
indicating, by the processor, to the network node a capability to function as a relay node;
communicating, by the processor, with a remote node via a second interface; and
relaying, by the processor, a packet between the network node and the remote node via the first interface and the second interface,
wherein the communicating with the remote node comprises receiving or transmitting user-plane data with the remote node on a high-frequency (HF) band.

2. The method of claim 1, wherein the first interface comprises a Uu interface, and wherein the second interface comprises a PC5 interface.

3. The method of claim 1, wherein the relaying comprises receiving a packet of the user-plane data from the remote node and transmitting the packet of the user-plane data to the network node, or receiving the packet of the user-plane data from the network node and transmitting the packet of the user-plane data to the remote node.

4. The method of claim 1, wherein the communicating with the remote node comprises communicating with the remote node on a first frequency band, and wherein the remote node communicates with the network node on a second frequency band different from the first frequency band.

5. The method of claim 4, wherein the first frequency band comprises a millimeter-wave frequency band.

6. The method of claim 1, further comprising: receiving, by the processor, a configuration authorizing the apparatus to function as the relay node.

7. The method of claim 1, wherein the communicating with the remote node is responsive to an indication by the remote node of a coverage problem.

8. A method, comprising:
communicating, by a processor of an apparatus, with a network node via a first interface;

communicating, by the processor, with a relay node via a second interface;

indicating, by the processor, to at least one of the network node and the relay node a capability to support a coverage enhancement via the relay node;

communicating, by the processor, a packet with the network node via the relay node; and receiving, by the processor, different user-plane configurations and control-plane configurations with respect to different remote nodes.

9. The method of claim 8, wherein the first interface comprises a Uu interface, and wherein the second interface comprises a PC5 interface.

10. The method of claim 8, further comprising:
communicating, by the processor, a control-plane signalling with the network node via the first interface; and
communicating, by the processor, a packet of user-plane data with the relay node via the second interface.

11. The method of claim 8, further comprising:
communicating, by the processor, a control-plane signalling and a packet of user-plane data with the network node via the first interface; and
communicating, by the processor, the packet of user-plane data with the relay node via the second interface.

12. The method of claim 8, wherein the communicating with the relay node comprises communicating with the relay node on a first frequency band, and wherein communicating with the network node comprises communicating with the network node on a second frequency band different from the first frequency band.

13. The method of claim 12, wherein the first frequency band comprises a millimeter-wave frequency band.

14. The method of claim 12, wherein the apparatus is out of coverage of the network node on first frequency band, and wherein the apparatus is in coverage of the network node on the second frequency band.

15. The method of claim 8, further comprising:
transmitting, by the processor, an indication of a coverage problem to at least one of the network node and the relay node.

16. The method of claim 8, further comprising:
communicating, by the processor, with a remote node via the second interface; and
relaying, by the processor, the packet between the relay node and the remote node via the second interface.

17. The method of claim 16, wherein the relaying comprises receiving a packet of user-plane data from the relay node and transmitting the packet of user-plane data to the remote node, or receiving the packet of user-plane data from the remote node and transmitting the packet of user-plane data to the relay node.

* * * * *